UNITED STATES PATENT OFFICE.

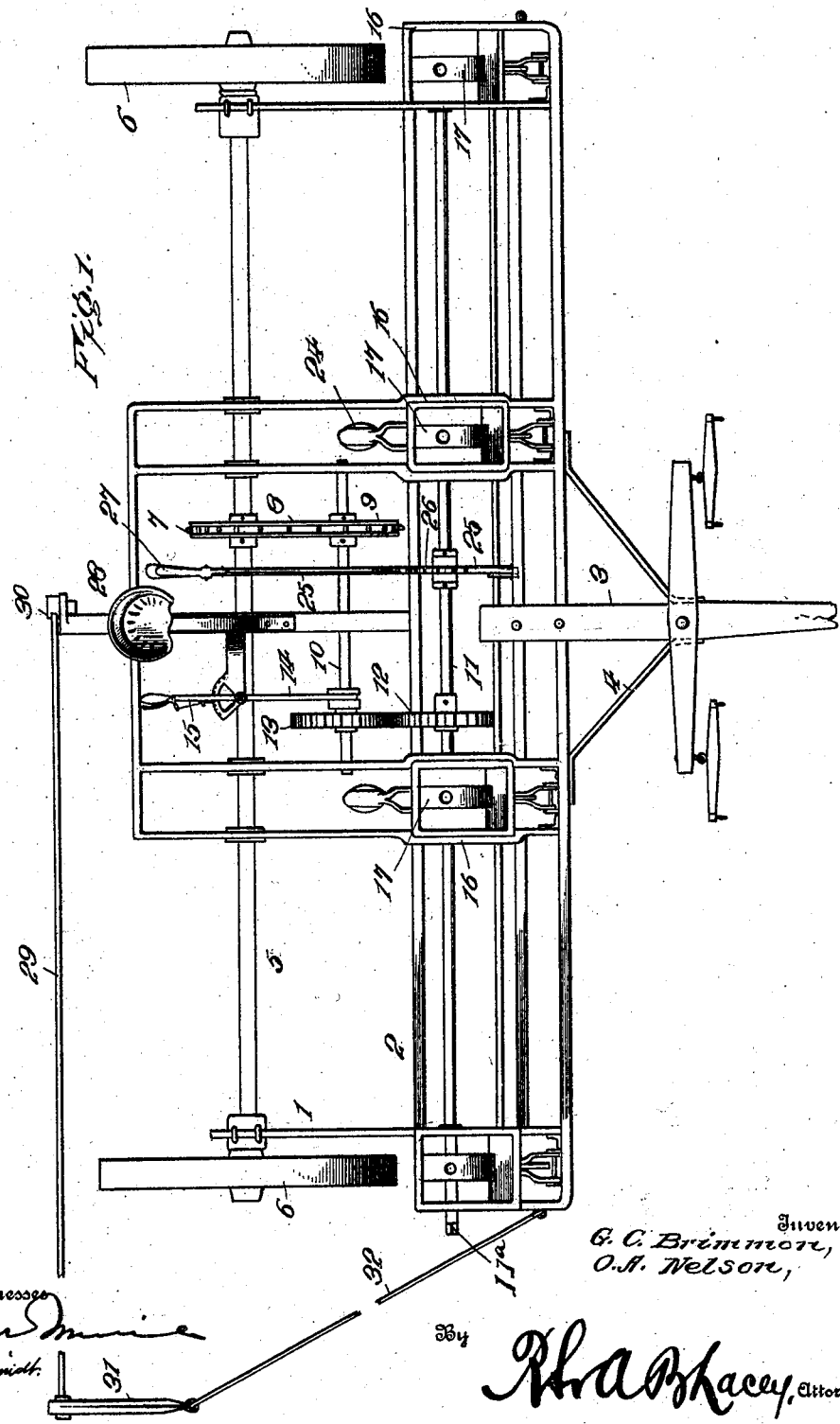

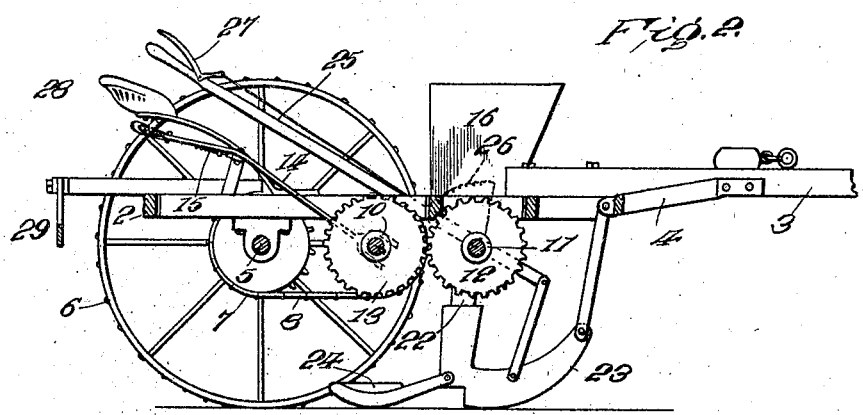
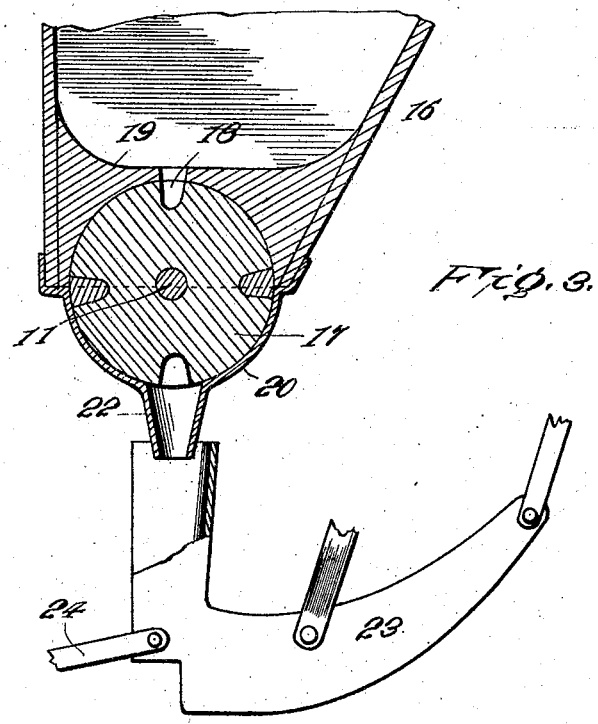

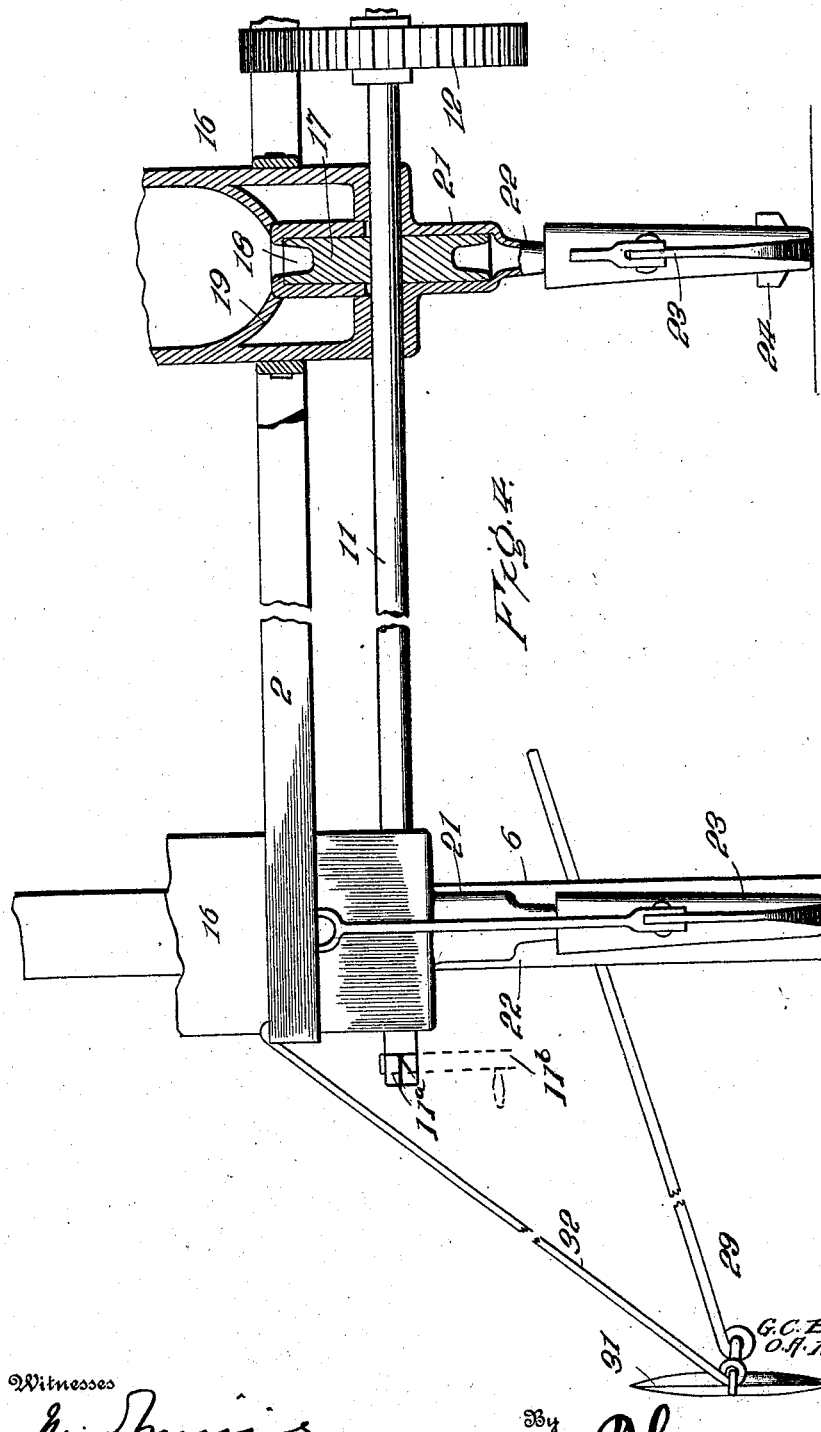

GILBERT C. BRIMMON AND OLE A. NELSON, OF HOMESTEAD, NORTH DAKOTA.

PLANTER.

No. 815,328.  Specification of Letters Patent.  Patented March 20, 1906.

Application filed September 12, 1905. Serial No. 278,120.

*To all whom it may concern:*

Be it known that we, GILBERT C. BRIMMON and OLE A. NELSON, citizens of the United States, residing at Homestead, in the county of Richland and State of North Dakota, have invented certain new and useful Improvements in Planters, of which the following is a specification.

This invention has for its object to devise a novel mechanism for dropping seed in check-rows and obviating the use of the accustomed check-line and adjunctive parts heretofore commonly employed in planting corn and which are objectionable because of the time required in adjusting and properly arranging the check-row mechanism.

This invention provides a machine for dropping seed in any desired number of rows and which may be regulated to drop any number of grain in a hill and to space the hills any required distance apart, according to the nature of the soil and the kind of grain to be planted.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a plan view of the machine. Fig. 2 is a vertical longitudinal section thereof. Fig. 3 is an enlarged vertical section of the seed-dropping mechanism; and Fig. 4 is a front elevation, parts broken away.

Corresponding and like parts are referred to in the following description and indicated in all the views of the drawings by the same reference characters.

The main or wheel frame comprises a series of longitudinal and transverse bars rigidly connected at their several points of crossing so as to provide a suitable structure. The number and character of the bars will depend largely upon the capacity and style of the machine.

The longitudinal bars are indicated at 1 and the transverse bars at 2. The pole or tongue 3 is connected to the transverse bars and is braced by hounds 4 in the usual manner. The axle 5 is mounted in bearings applied to the longitudinal bars so as to turn freely and is provided at its end with ground-wheels 6, which constitute drivers to impart rotary movement to the axle as the machine is drawn over the field. A sprocket-wheel 7 is fast to the axle 5 and is connected by sprocket-chain 8 with a companion sprocket-wheel 9, fast to a shaft 10, paralleling the axle and journaled in bearings secured to intermediate longitudinal bars. The operating-shaft 11 is provided with a spur-gear 12, which is adapted to mesh with a spur-gear 13, loosely mounted upon the shaft 10, so as to be thrown into and out of gear with the part 12. The spur-gear 13, while slidably mounted upon the shaft 10, is mounted thereon for rotation therewith and is adapted to be moved by means of a lever 14, fulcrumed to a convenient portion of the main frame and adapted to be secured in the located position by the usual hand-latch and notched segment, as indicated at 15.

The seeding mechanism comprises hoppers 16, dropping-disks 17, and furrow openers and closers. The seed-dropping disks 17 are fast to the operating-shaft 11 and are provided in their periphery with a series of cups or pockets for reception of the grain in the operation of the machine. The capacity of the cups or pockets 18 may be varied either by means of an adjustable bottom or by means of pieces removably fitted therein. By placing a plug or stopper in one or more of the cups or pockets the distance apart of the hills may be regulated. A housing 19 covers the upper portion of each seed-dropping disk 17 and is provided in its topmost portion with an opening to admit of the grain having free access to the cups or pockets of the dropping-disks. Housings or casings 20, pendent from opposite ends of the housing, embrace the lower portion of the seed-dropping disk and terminate in vertical portions 21, in which the operating-shaft 11 is mounted, and which are spaced apart to provide a passage for the escape of the grain into the spout 22. The parts 20 of the housing fit close to the periphery of the seed-dropping disk, so as to retain the grain in the cups or pockets until opposite the space formed between the pendent portions 21, thereby insuring proper and correct dropping of the seed necessary in check-row planting.

The runners or furrow-openers 23 may be of any approved construction and are pivotally connected to the front transverse bar of the main frame in a manner to admit of raising and lowering the runners when it is required to throw them into or out of action, as when turning the machine preliminary to recrossing the field. A weighted coverer 24 cooperates with the opener and is arranged to operate in the rear thereof, so as to cover the seed and press the earth thereon after the grain has been dropped into the trench or furrow. It is to be understood that the openers in longitudinal alinement with the drive-wheel 6 need not be provided with coverers 24, since the drive-wheels perform the office of both covering and pressing the earth upon the grain. A lever 25 is provided for raising and lowering the runners and is held in the required position by means of a notched bar 26 and hand-latch 27.

Both levers 14 and 25 extend within convenient reach of the driver's seat 28, and the latter is preferably arranged in the rear of the axle 5 to admit of advantage being taken of the weight of the driver as a counterbalance for the machine. The marker is likewise arranged so as to be readily accessible from the driver's seat and consists of a bar 29, pivoted at 30 to the rear end of a longitudinal bar and provided at its outer end with a blade 31. A wire or analogous connection 32 joins the front end of the blade 31 with a corner of the main frame, the latter being provided at each corner with an eyebolt to receive a hook or other fastening at the front end of the connection 32. The marker is adapted to be thrown from one side of the machine to the other, according to the direction of travel.

To provide for proper adjustment of the seeding mechanism to insure dropping of the seed in straight lines transversely of the field, an end portion 11$^a$ of the operating-shaft 11 is extended and constructed to have a tool 11$^b$ fitted thereto—such, for instance, as a wrench or like implement—the projecting end of said operating-shaft being made angular to admit of positive interlocking of said wrench or implement therewith.

Having thus described the invention, what is claimed as new is—

1. In a planter, the combination of an operating-shaft having an end portion extended and made angular for reception of an adjusting-tool, seed-dropping mechanism in cooperative relation with said operating-shaft to be actuated thereby, an axle mounted to rotate and adapted to have the driving power applied thereto, a shaft 10 intermediate of said axle and operating-shaft, gearing connecting the axle with said shaft 10, and further gearing connecting the shaft 10 with the operating-shaft and relatively shiftable parts to admit of throwing the operating-shaft into or out of gear at will.

2. In a planter, the combination of a main frame, seed-dropping mechanism carried thereby, an axle loosely mounted in said frame and adapted to have the driving power applied thereto, means for transmitting motion from said axle to the seed-dropping mechanism and including relatively shiftable elements to admit of throwing the seed-dropping mechanism into and out of gear, runners forming furrow-openers, means loosely connecting said runners with the main frame, means for adjusting said runners, said adjusting means being mounted upon the main frame, and weighted coverers loosely connected to the runners and track in the wake thereof, the said operating-shaft having an end portion extended and constructed to receive an adjusting-tool.

In testimony whereof we affix our signatures in presence of two witnesses.

GILBERT C. BRIMMON. [L. S.]
OLE A. NELSON. [L. S.]

Witnesses:
    ED. HERBRANSEN,
    M. O. STANDY.